(12) United States Patent
Blease et al.

(10) Patent No.: US 7,983,205 B1
(45) Date of Patent: Jul. 19, 2011

(54) OUTGOING INTERFACE MAPPING FOR MULTICAST TRAFFIC

(75) Inventors: David H. Blease, Holliston, MA (US); Eric L. Peterson, Westford, MA (US); William Coutts, Barrington, RI (US); Prasad Deshpande, Framingham, MA (US); Jerome P. Moisand, Arlington, MA (US); Gregory M. Dalle, Rome (IT)

(73) Assignee: Juniper Networks, Inc., Sunnyvale, CA (US)

( * ) Notice: Subject to any disclaimer, the term of this patent is extended or adjusted under 35 U.S.C. 154(b) by 1591 days.

(21) Appl. No.: 11/068,523

(22) Filed: Feb. 28, 2005

Related U.S. Application Data

(63) Continuation-in-part of application No. 10/601,131, filed on Jun. 20, 2003, now Pat. No. 7,746,799.

(51) Int. Cl.
*H04H 20/71* (2008.01)
*H04J 3/26* (2006.01)
*H04L 12/28* (2006.01)

(52) U.S. Cl. .......... 370/312; 370/432; 370/401

(58) Field of Classification Search .......... None
See application file for complete search history.

(56) References Cited

U.S. PATENT DOCUMENTS

| 6,331,983 | B1 * | 12/2001 | Haggerty et al. | 370/400 |
| 2004/0090970 | A1 * | 5/2004 | Sanchez et al. | 370/397 |
| 2004/0258003 | A1 * | 12/2004 | Kokot et al. | 370/254 |
| 2005/0152370 | A1 * | 7/2005 | Meehan et al. | 370/393 |

* cited by examiner

*Primary Examiner* — Ayaz R Sheikh
*Assistant Examiner* — Sori A Aga
(74) *Attorney, Agent, or Firm* — Shumaker & Sieffert, P.A

(57) ABSTRACT

Multiple subscriber devices are connected to a network device via one or more network switches. The network device transmits multicast traffic to the subscriber devices. In particular, the network device may receive membership requests for a multicast group from the subscriber devices via the network switch on a first interface, i.e., a mapping interface. The network device sends a multicast stream associated with the multicast group to the network switch on a second interface, i.e. an outgoing interface (OIF). Upon receiving a membership request, the network device maps the membership request to an OIF dedicated to the multicast group. In this way, when multiple subscriber devices connected to the same switch request the same multicast stream, each membership request will map to the same OIF. The network device sends one copy of the multicast stream to the network switch on the dedicated OIF.

39 Claims, 7 Drawing Sheets

| | GroupPrefix | SourcePrefix | OutgoingInterface |
|---|---|---|---|
| 1 | 232.0.0.1/32 | 51.0.0.1/32 | atm3/0.1 |
| 2 | 232.0.0.1/32 | 51.0.0.2/32 | atm3/0.2 |
| 3 | 233.0.0.1/32 | * | atm3/0.3 |
| 4 | 233.0.0.0/24 | 51.0.0.1/32 | atm3/0.4 |
| 5 | 233.0.0.0/24 | 51.0.0.2/32 | atm3/0.5 |
| 6 | 234.0.0.0/24 | 51.0.0.0/24 | self |

OUTGOING INTERFACE MAPPING FOR MULTICAST TRAFFIC

This application is a continuation-in-part of U.S. patent application Ser. No. 10/601,131, filed Jun. 20, 2003 now U.S. Pat. No. 7,746,799.

TECHNICAL FIELD

The invention relates to computer networks and, more particularly, to transmission of multicast traffic within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. Routing devices within a network, referred to as routers, maintain tables of routing information that describe available routes through the network. Upon receiving an incoming packet, the router examines information within the packet and forwards the packet in accordance with the routing information.

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links.

Internet Service Providers (ISPs) provide subscriber devices with access to the Internet or another network via routers maintained by the ISPs. A subscriber device may comprise a personal computer, laptop, workstation, personal digital assistant (PDA), wireless device, network-ready appliance, file server, print server or another device. For example, multiple subscriber devices may connect to a router via a network switch, e.g., a digital subscriber line access multiplexer (DSLAM) or an Ethernet switch, maintained by the ISP. Although data for the multiple subscriber devices connected to the switch are transported over the same physical connection, each of the subscriber devices has a dedicated subscriber interface, i.e., virtual connection, to the router and hence the Internet.

In conventional network systems, the router receives a membership request, e.g., an Internet Group Management Protocol (IGMP) multicast group membership request, for a multicast group, e.g., an Internet Protocol television (IPTV) channel, on a subscriber interface and sends the multicast stream associated with the multicast group on the same subscriber interface. Each subscriber interface comprises a separate and distinct virtual connection between the network device and the respective subscriber device. Therefore, when two or more subscriber devices connected to the same switch request the same multicast stream, the network device sends an identical copy of the multicast stream for each of the requesting subscriber devices over the same physical connection.

The conventional techniques severely limit the number of multicast groups that can be simultaneously supported and/or significantly reduces the number of subscribers that can be supported on the switch. For example, if the physical connection between the network switch and the network device comprises a bandwidth of approximately 100 Mbps and each multicast stream is 5 Mbps, the physical connection can only support twenty virtual connections. In other words, the physical connection can support up to twenty subscribers if each subscriber requests only one multicast stream, or the physical connection can support up to twenty different multicast groups if twenty different multicast streams are requested.

SUMMARY

In general, the invention is directed to techniques for transmitting multicast traffic from a network device to subscriber devices within a computer network. Multiple subscriber devices may be connected to a network device via one or more network switches, such as digital subscriber line access multiplexers (DSLAMs) or Ethernet switches. The techniques allow a network device, such as a router, to receive a membership request for a multicast group from a subscriber device via a network switch on a first virtual interface, i.e., a mapping interface. In response, the network device sends a multicast stream associated with the multicast group to the network switch on a second virtual interface, i.e. an outgoing interface (OIF).

A system administrator may configure an OIF map for the mapping interface. The OIF map associates OIFs of the network device with specific multicast groups. Upon receiving a membership request, the network device maps the membership request to an OIF dedicated to the multicast group based on the OIF map. In this way, when multiple subscriber devices connected to the same switch request the same multicast stream, the network device will map each membership request to the same OIF. The network device sends one copy of the multicast stream to the network switch on the dedicated OIF. The network switch is then responsible for replicating and forwarding the multicast stream to the requesting subscriber devices.

The network switch may be connected to the network device over a shared access network supporting a data link layer protocol, such as the Asynchronous Transfer Mode (ATM) protocol or the Ethernet protocol. The multicast transmission techniques described herein may significantly reduce the amount of multicast traffic between the network device and the network switch. In this way, the shared access network can deliver multicast streams associated with a predetermined number of multicast groups to the network switch. Furthermore, because membership requests are received on-demand, and because the set of multicast groups in-demand is likely to vary, the shared access network may be designed to support fewer multicast groups than are offered to the subscribers.

In one embodiment, a method comprises receiving a membership request from a subscriber device via a network switch for a multicast group on a first interface of a network device. The method further comprises sending a multicast stream associated with the multicast group to the network switch on a second interface of the network device.

In another embodiment, a network device comprises a first interface between the network device and a network switch that carries a membership request from a subscriber device for a multicast group, and a second interface between the network device and the network switch that carries a multicast stream associated with the multicast group. The network device also comprises a control unit that receives the membership request on the first interface and sends to the multicast stream on the second interface.

In another embodiment, a computer-readable medium comprises instructions that cause a programmable processor to receive a membership request from a subscriber device via a network switch for a multicast group on a first interface of a network device, and send a multicast stream associated with the multicast group to the network switch on a second interface of the network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
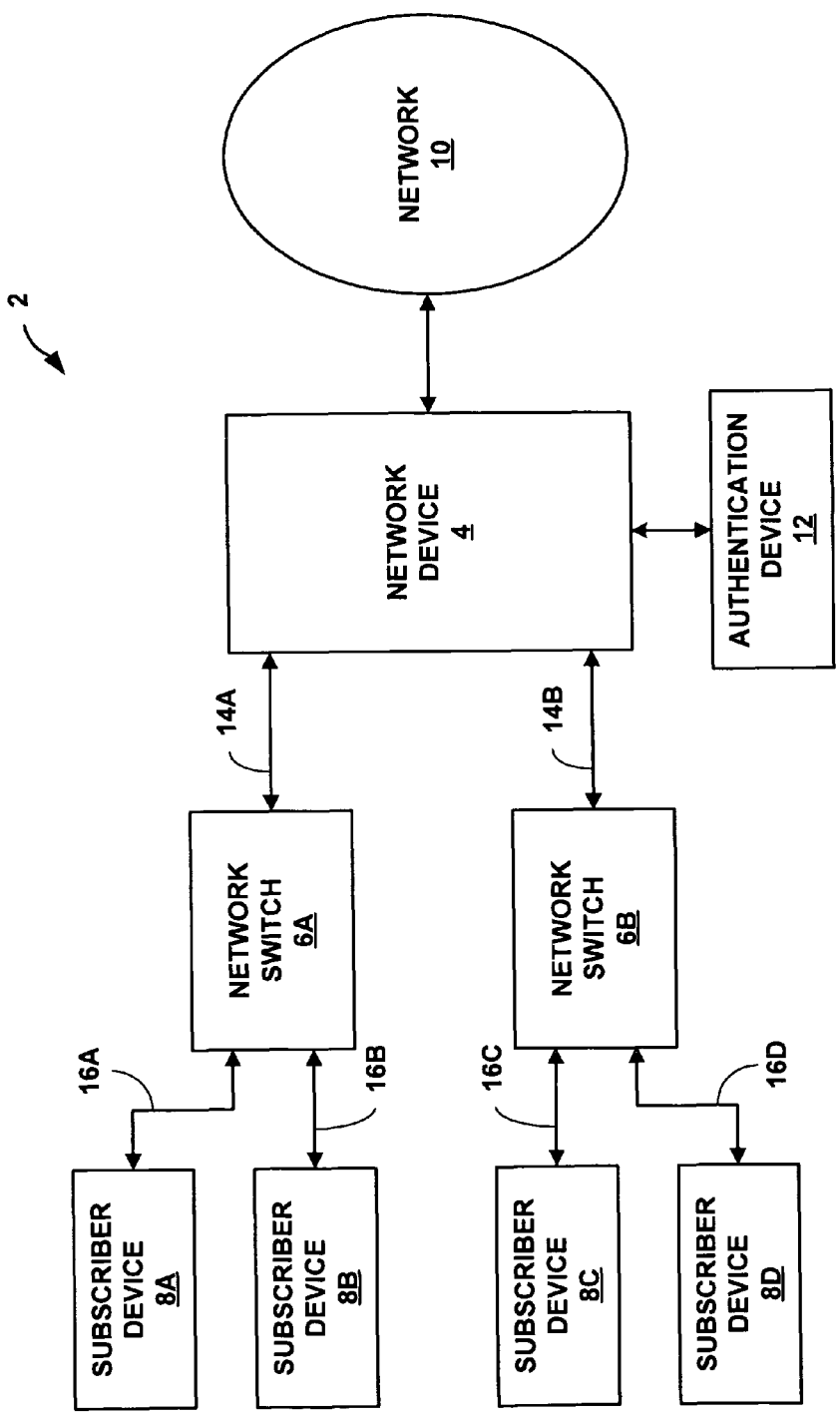
FIG. 1 is a block diagram illustrating an exemplary system in which a network device provides subscriber devices with connectivity to a network.

FIG. 1 is a block diagram illustrating an exemplary system 2 in which a network device 4 provides subscriber devices 8A-8D ("subscriber devices 8") with connectivity to a network 10. Network 10 represents any computer network and may have a variety of networked resources capable of data communication. For example, network 10 may include routers, hubs, gateways, servers, workstations, network printers and faxes or other devices. Moreover, network 10 may be the Internet or any public or private network.

As illustrated, subscriber devices 8A and 8B connect to network device 4 via network switch 6A and subscriber devices 8C and 8D connect to network device 4 via network switch 6B. Subscriber devices 8 may comprise personal computers, laptops, workstations, personal digital assistants (PDAs), wireless devices, network-ready appliances, file servers, print servers or other devices. In other embodiments, any number of network switches may connect to network device 4 and any number of subscriber devices may connect to each of the network switches.

Network device 4 is capable of providing subscriber devices 8 with multicast traffic, e.g., Internet Protocol television (IPTV), from network 10. Subscriber devices 8 request multicast streams, e.g., IPTV channels, by sending a membership request for a specific multicast group to network device 4. If network 10 comprises an Internet Protocol version 4 (IPv4) network, the membership requests are signaled to network device 4 using the Internet Group Management Protocol (IGMP). In the case where network 10 comprises an IP version 6 (IPv6) network, the membership requests are signaled using the Multicast Listener Discovery (MLD) protocol.

The multicast transmission techniques, described in more detail below, allow network device 4 to receive a membership request for a multicast group on a first interface, i.e., a mapping interface, and send a multicast stream associated with the multicast group on a second interface, i.e., an outgoing interface (OIF). The first and second interfaces may comprise either physical interfaces or virtual interfaces. Network device 4 maps the received membership request to an OIF dedicated to the requested multicast group. The first interface may be viewed as a mapping interface in that the first interface is configured to use an OIF map that maps membership requests received on the first interface to a dedicated OIF.

When network device 4 receives membership requests from subscriber device 8A and subscriber device 8B for the same multicast group, network device 4 maps both membership requests to the same OIF. Network device 4 then sends one copy of the multicast stream to network switch 6A on the mapped OIF. Network switch 6A replicates and forwards the multicast stream to subscriber device 8A and subscriber device 8B.

Network switches 6A and 6B ("network switches 6") may comprise digital subscriber line access multiplexers (DSLAMs), Ethernet switches, or other devices. Each of network switches 6 may communicate with network device 4 over a shared access network supporting a data link layer protocol 14, e.g. the Asynchronous Transfer Mode (ATM) protocol or the Ethernet protocol. A Broadband Remote Access Server (BRAS) application may aggregate output from switches 6 into a higher-speed uplink to network device 4.

Each of subscriber devices 8 may utilize the Point-to-Point protocol (PPP) 16 to communicate with network switches 6. Specifically, using PPP 16, one of subscriber devices 8 requests access to network 10 and provides user information, such as a username and password. PPP 16 may be supported on digital subscriber lines (DSLs) that connect subscriber devices 8 with network switches 6. In other embodiments, subscriber devices 8 may utilize a non-PPP protocol to communicate with network switches 6.

In some embodiments, network device 4 may comprise a router that maintains routing information between subscriber devices 6 and network 10. Network device 4 may support the BRAS application. In particular, network device 4 authenticates the user information received from subscriber devices 8. In the illustrated embodiment, network system 2 includes an authentication device 12, such as a Remote Authentication Dial-In User Server (RADIUS). Network device 4 forwards the user information to authentication device 12. Authentication device 12 authenticates the user information and provides the authentication to network device 4. In other embodiments, network device 4 may internally authenticate the user information.

The multicast transmission techniques described herein may significantly reduce the amount of multicast traffic between network device 4 and network switches 6. For example, regardless of the number of subscriber devices 8 connected to the same network switch that request the same multicast stream, network device 4 only sends one copy of the multicast stream to the network switch. In this way, network device 4 can deliver multicast streams associated with a predetermined number of multicast groups to each of network switches 6B. Furthermore, because subscriber devices 8 issue membership requests when needed (i.e., "on-demand"), and because the set of multicast groups in-demand is likely to vary, network device 4 and network switches 6 may be designed to support fewer multicast groups than are offered to the subscribers.

Figure 2:
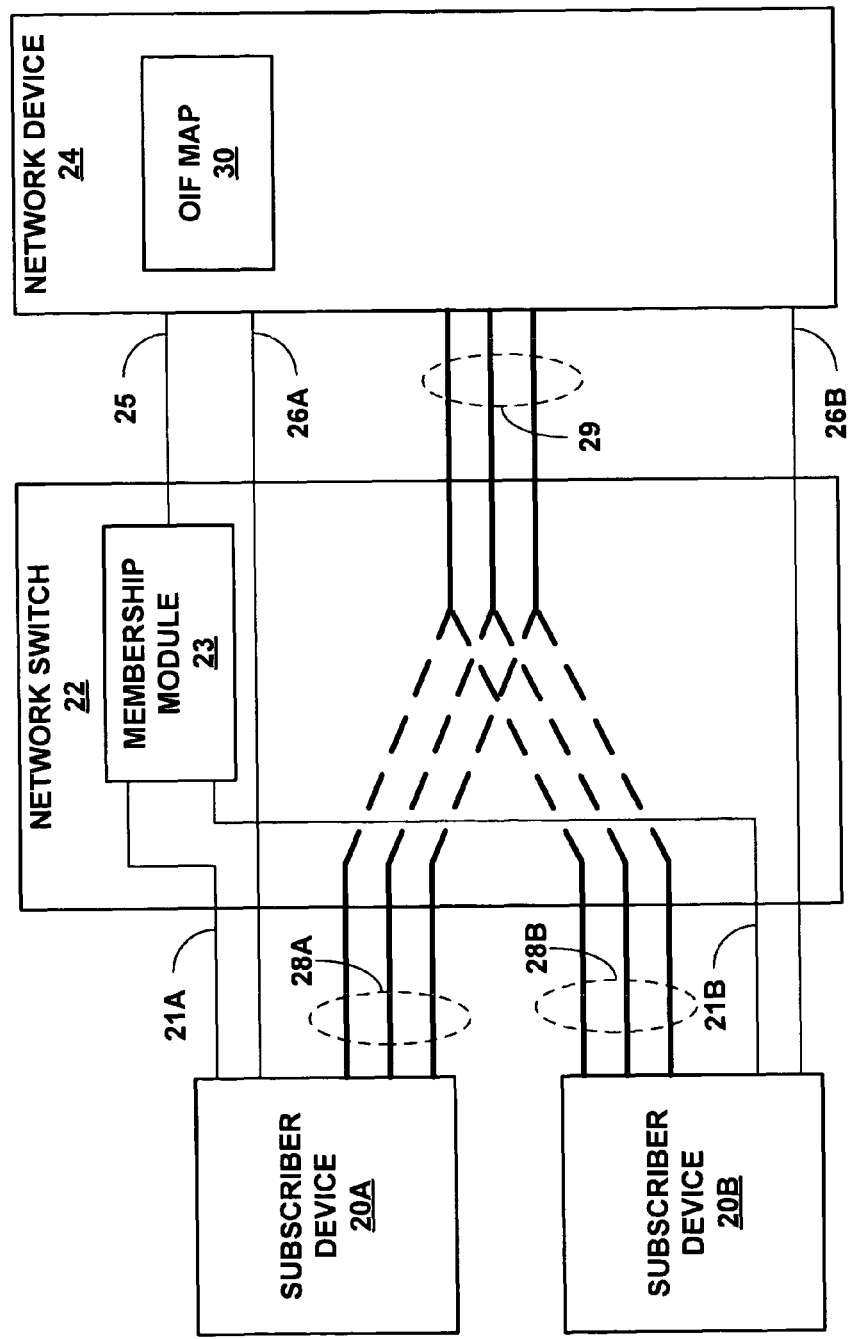
FIG. 2 is a block diagram illustrating a network switch and a network device connected over an ATM shared access network.

FIG. 2 is a block diagram illustrating a network switch 22 and a network device 24 connected over an ATM shared access network. Subscriber devices 20A and 20B ("subscriber devices 20") connect to network device 24 via network switch 22. Subscriber devices 20, network switch 22, and network device 24 may operate substantially similar to subscriber devices 8, network switches 6, and network device 4, respectively, from FIG. 1. Network device 24 may provide subscriber devices 20 with access to a network, e.g., network 10 from FIG. 1. For purposes of explanation, it is assumed herein that the network comprises an IPv4 network. In other embodiments, the network may comprise an IPv6 network.

Each of subscriber devices 20 connects to network switch 22 over a plurality of subscriber interfaces, e.g., virtual connections. In this case, the virtual connections comprise ATM permanent virtual circuits (PVCs). In the illustrated embodiment, subscriber device 20A has an IGMP interface 21A, a unicast interface 26A, and a plurality of multicast interfaces 28A. Each of multicast interfaces 28A carries a multicast stream for a different multicast group requested by subscriber device 20A. Subscriber device 20B has an IGMP interface 21B, a unicast interface 26B, and a plurality of multicast interfaces 28B. Each of multicast interfaces 28B carries a multicast stream for a different multicast group requested by subscriber device 20B.

In the illustrated embodiment, network switch 22 may comprises a DSLAM. Network device 24 is connected to network switch 22 via a single physical connection. Within the physical connection, network device 24 includes a plurality of virtual connections. In the illustrated embodiment, network device 24 has a mapping interface 25, unicast interfaces 26, and a plurality of OIFs 29. Each of OIFs 29 is dedicated to a specific multicast group.

Subscriber devices 20 send and receive unicast traffic on unicast interfaces 26A and 26B ("unicast interface 26"). Network switch 22 passes unicast interfaces 26 directly to network device 24. When network device 24 receives requests for unicast data on unicast interfaces 26, network device 24 retrieves the data from the network and sends the data to subscriber devices 20 on unicast interfaces 26.

In order to receive multicast traffic, subscriber devices 20 send membership requests for specific membership groups to network device 24 via network switch 22. In the illustrated embodiment, subscriber devices 20 use the IGMP to signal the membership requests to network device 24. In the case of an IPv6 network, subscriber devices 20 use the MLD protocol to signal membership requests to network device 24. Subscriber devices 20 send the membership requests to network switch 22 on IGMP interfaces 21A and 21B ("IGMP interfaces 21"). In addition, when subscriber interfaces 20 no longer want to receive multicast traffic associated with a specific multicast group, subscriber devices 20 send leave requests for the multicast group on IGMP interfaces 21.

IGMP interfaces 21 are terminated at membership module 23 on network switch 22. Membership module 23 aggregates the membership requests from subscriber devices 20 and forwards the membership requests to network device 24 on mapping interface 25. Membership module 23 may act as an IGMP proxy and issue proxy membership requests for the multicast groups to network device 24. In that case, membership module 23 behaves as an IGMP querier to subscriber devices 20 and as an IGMP host to network device 24.

Network device 24 includes an OIF map 30 configured for mapping interface 25. Specifically, OIF map 30 associates each of OIFs 29 of network device 24 with its respective multicast group. A system administrator may configure OIF map 30 for mapping interface 25 using command line interface (CLI) commands. For example, for IPv4 IGMP the interface configuration command may comprise: ip igmp apply-oif-map <map-name>, where <map-name> represent an identifier of an OIF map loaded within network device 24. For IPv6 MLD the interface configuration command may comprise: ipv6 mld apply-oif-map <map-name>. In other cases, the system administrator may use the same commands to assign OIF map 30 to an interface profile, which is a configuration template that may be used to easily configure dynamic interfaces, e.g., mapping interface 25. In general, OIF map 30 defines one or more multicast groups and maps each of the groups to a corresponding one of OIFs 29. Network device 24 receives the commands and applies OIF map 30 consistent with the commands.

Upon receipt of a membership request on mapping interface 25, network device 24 accesses OIF map 30 and compares the membership request to entries in OIF map 30. When the membership request matches one of the membership groups, network device 24 maps the received membership request to the one of OIFs 29 dedicated to the requested multicast group in accordance with OIF map 30. For example, if both of subscriber devices 20 request the same multicast stream, network device 24 maps both membership requests to the same one of OIFs 29. Network device 24 then sends one copy of the multicast stream to network switch 22 on the dedicated one of OIFs 29.

Unlike conventional multicast transmission techniques, network device 24 sends a multicast stream to the requesting subscriber device on an OIF different than the interface on which network device 24 received the membership request. In fact, mapping interface 25 carries only IGMP proxy packets and does not carry actual multicast traffic. Furthermore, each of OIFs 29 is dedicated to a respective multicast group and not to the subscribed device 20 requesting the multicast stream. Therefore, network device 24 sends one copy of the multicast stream for all requesting subscriber devices 20 connected to the same network switch 22 instead of sending a separate copy of the multicast stream for each of the requesting subscriber devices.

As shown in FIG. 2, network switch 22 is responsible for replicating and forwarding the multicast streams from network device 24 to subscriber devices 20. Network switch 22 performs a cross-connection between the dedicated OIFs 29 of network device 24 and the multicast interfaces 28 of subscriber devices 20. In order to perform the cross-connection, network switch 22 is aware of the multicast groups in which subscriber devices 20 are interested. Network switch 22 may gain this knowledge by snooping the membership requests on mapping interface 25 or by receiving Layer 2 Control Protocol (L2CP) instructions from network device 24.

In some cases, additional network switches (not shown in FIG. 2) may be connected to network device 24. Each of the additional network switches may connect to network device 24 over a respective mapping interface and at least one OIF that is dedicated to a specific multicast group. The system administrator configures each of the mapping interfaces to use only one OIF map. In some embodiments, the system administrator may configure each of the mapping interfaces to use a separate OIF map included in network device 24. In other embodiments, the system administrator may configure each of the mapping interfaces to use a common OIF map, e.g., OIF map 30. In still other embodiments, some of the mapping interfaces may have separate OIF maps and some of the mapping interfaces may share OIF maps.

When a match is not found between a received membership request and the membership groups listed in OIF map 30, the membership request is not mapped to one of OIFs 29. In the case where an interface carrying a membership request is not configured to use an OIF map, network device 24 may send the requested multicast stream on an unmapped OIF. The unmapped OIF may comprise the interface carrying the membership request. In the illustrated embodiment, the unmapped OIF may comprise unicast interfaces 26.

Figure 3:
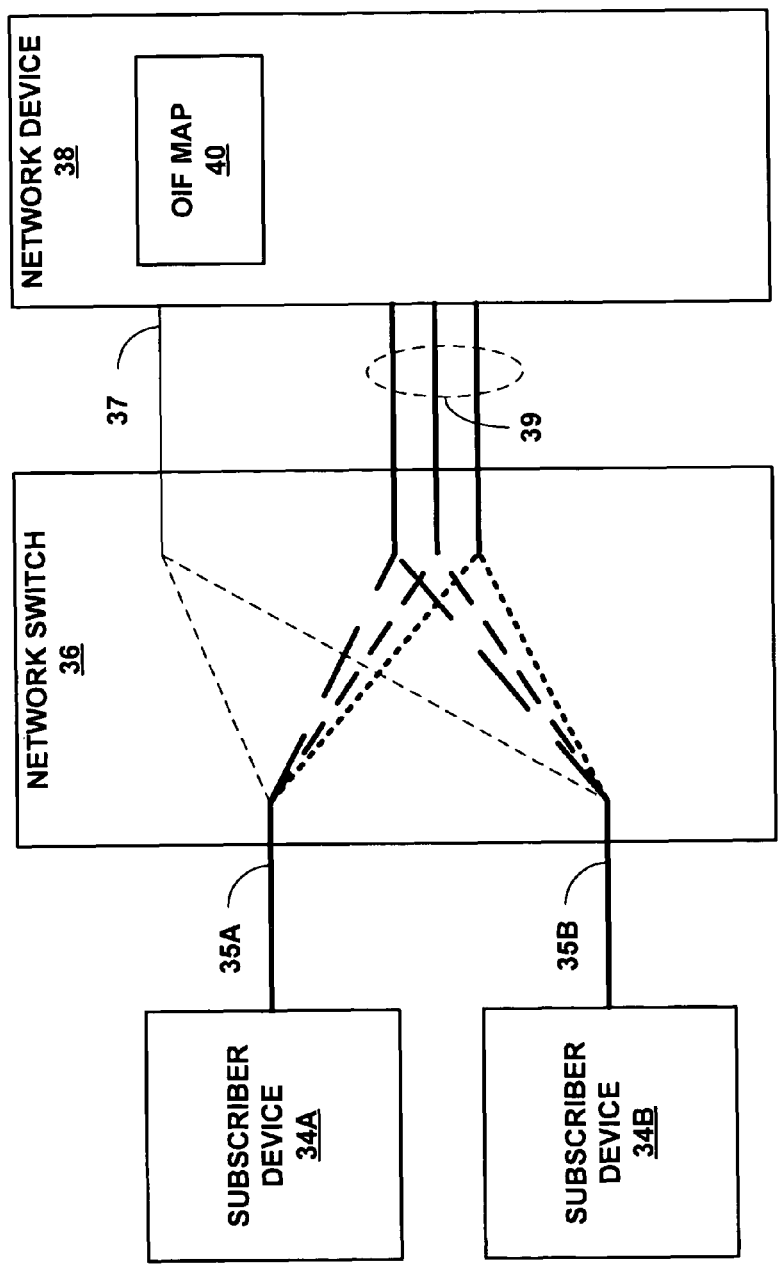
FIG. 3 is a block diagram illustrating a network switch and a network device connected over an Ethernet shared access network.

FIG. 3 is a block diagram illustrating a network switch 36 and a network device 38 connected over an Ethernet shared access network. Subscriber devices 34A and 34B ("subscriber devices 34") connect to network device 38 via network switch 36. Subscriber devices 34, network switch 36, and network device 38 may operate substantially similar to subscriber device 8, network switches 6, and network device 4 from FIG. 1. Network device 38 may provide subscriber devices 34 with access to a network, e.g., network 10 from FIG. 1. For purposes of explanation, it is assumed herein that the network comprises an IPv4 network. In other embodiments, the network may comprise an IPv6 network.

Subscriber devices 34 connect to network switch 36 over mapping interfaces 35A and 35B ("mapping interfaces 35"). In this case, mapping interfaces 35 comprise Ethernet virtual local access networks (VLANs). Each of mapping interfaces 35 carries IGMP traffic, unicast traffic, and multicast streams requested by the corresponding subscriber device 34. In the illustrated embodiment, network switch 36 may comprise an Ethernet switch.

Network device 38 is connected to network switch 36 via a single physical connection. Within the physical connection, network device 38 includes a plurality of virtual connections. In the illustrated embodiment, network device 38 has an interface 37 onto which mapping interfaces 35 are bridged for transportation to network device 38. Therefore, mapping interfaces 35 are visible to network device 38. Network device 38 also has a plurality of OIFs 39. Each of OIFs 39 may be dedicated to a specific multicast group.

Subscriber devices 34 send and receive unicast traffic on mapping interfaces 35. Network switch 36 bridges the traffic from subscriber interfaces 35 onto interface 37. When network device 38 receives requests for unicast data on interface 37, network device 38 retrieves the data from the network and sends the data to network switch 36 on mapping interfaces 35 over interface 37. Network switch 36 then forwards the unicast data to subscriber devices 34 on mapping interfaces 35.

In order to receive multicast traffic, subscriber devices 34 send membership requests for specific membership groups to network device 38 via network switch 36. In the illustrated embodiment, subscriber devices 34 use the IGMP to signal the membership requests to network device 38. In the case of an IPv6 network, subscriber devices use the MLD protocol to signal membership requests to a network device. Subscriber devices 34 send the membership requests to network switch 36 on mapping interfaces 35. In addition, when subscriber interfaces 34 no longer want to receive multicast traffic associated with a specific multicast group, subscriber devices 34 send leave requests for the multicast group on mapping interfaces 35.

Network switch 36 bridges the membership requests on mapping interfaces 35 from subscriber devices 34 to network device 38 on interface 37. Network device 38 includes an OIF map 40 configured for mapping interfaces 35. OIF map 40 associates OIFs 39 of network device 38 with their respective multicast groups. A system administration may configure OIF map 40 for mapping interfaces 35 using CLI commands. Example interface configuration commands are given above in reference to FIG. 2. The system administrator may assign OIF map 40 to an interface profile, which is a configuration template that may be used to easily configure dynamic interfaces, e.g., mapping interfaces 35.

Upon receipt of a membership request on one of mapping interfaces 35, network device 38 access OIF map 40 and compares the membership request to entries in OIF map 40. When the membership request matches one of the membership groups, network device 38 maps the received membership request to the one of OIFs 39 dedicated to the requested multicast group. For example, if both of subscriber devices 34 request the same multicast stream, network device 38 maps both membership requests to the same one of OIFs 39. Network device 38 then sends one copy of the multicast stream to network switch 36 on the dedicated one of OIFs 39.

As shown in FIG. 3, network switch 36 is responsible for replicating and forwarding the multicast streams from network device 38 to subscriber devices 34. Network switch 36 performs a cross-connection between the dedicated OIFs 39 of network device 38 and mapping interfaces 35 of subscriber devices 34. In order to perform the cross-connection, network switch 36 needs to be aware of the multicast groups in which subscriber devices 34 are interested. Network switch 36 may gain this knowledge by snooping the membership requests on mapping interfaces 35 or by L2CP instructions from network device 38.

In some cases, additional network switches may be connected to network device 38. Each of the additional network switches may connect to network device 38 over mapping interfaces and at least one OIF dedicated to a specific multicast group. As described above, the system administrator configures each of the mapping interfaces to use only one OIF map.

When a match is not found between a received membership request and the membership groups listed in OIF map 40, the membership request is not mapped to one of OIFs 39. In order to add one of mapping interfaces 35 as an OIF, the membership request must match to a "self" entry in OIF map 40. In the case where an interface carrying a membership request is not configured to use an OIF map, network device 38 may send the requested multicast stream on an unmapped OIF. The unmapped OIF may comprise the interface carrying the membership request.

Figure 4:
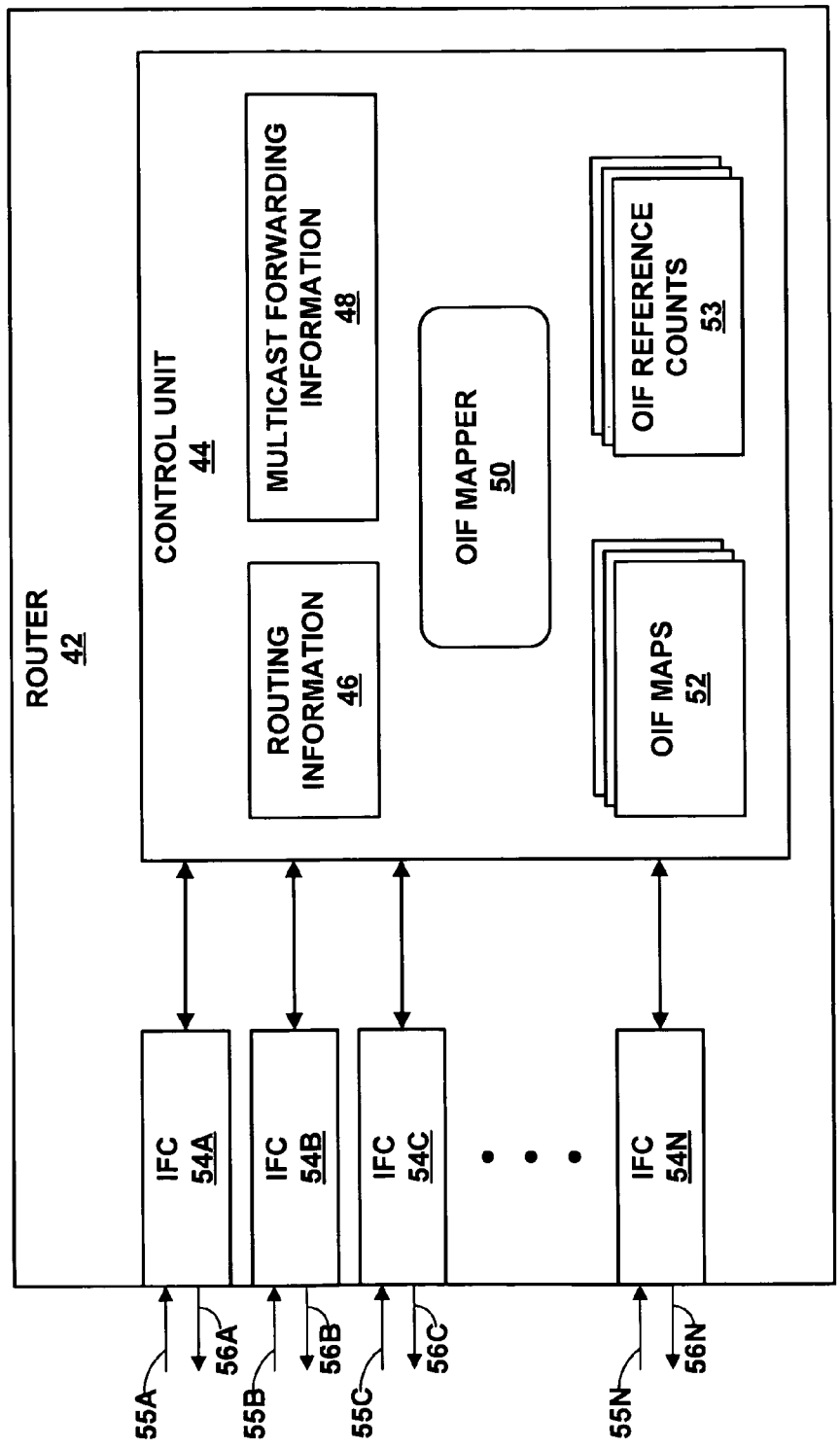
FIG. 4 is a block diagram illustrating an exemplary router in accordance with an embodiment of the invention.

FIG. 4 is a block diagram illustrating an exemplary router 42 in accordance with an embodiment of the invention. Router 42 may operate substantially similar to network device 4 in FIG. 1, network device 24 in FIG. 2, or network device 38 in FIG. 3. Router 42 may provide subscriber devices access to a network, e.g., network 10 from FIG. 1. The subscriber devices may connect to router 42 via network switches, e.g., DSLAMs or Ethernet switches. In general, router 42 is capable of receiving membership requests for multicast groups on a first interface and sending multicast streams associated with the multicast groups on a second interface that may be dedicated to a network switch servicing the subscriber devices from which the requests may be received.

In the illustrated embodiment, router 42 includes interface cards 54A-54N ("IFCs 54") that receive packets on inbound links 55A-55N ("inbound links 55") and send packets on outbound links 56A-56N ("outbound links 56"). Router 42 also includes a control unit 44 that maintains routing information 46 to reflect the current topology of a network and other network entities to which router 42 is connected. In general, when router 42 receives a unicast packet via one of inbound links 55, control unit 44 determines a destination for the packet in accordance with routing information 46 and outputs the packet on one of outbound links 56 based on the destination. When router 42 receives a multicast packet via one of inbound links 55, control unit 44 forwards the packet on a set of outbound links 56 in accordance with multicast forwarding information 48.

Upon creation of a subscriber interface between a subscriber device and router 42, by PPP for example, control unit 44 authenticates user information of the corresponding subscriber device. In some embodiments, router 42 may couple to an authentication device, such as authentication device 12 from FIG. 1. Control unit 44 may pass the user information to the authentication device. The authentication device may then authenticate the user information. In other embodiments, control unit 44 may internally authenticate the user information.

After control unit 44 authenticates the user information, an interface profile is created which may contain access filters to permit or deny the subscriber device from requesting certain multicast groups and source-groups. For example, the subscriber device may comprise a set-top box for IPTV. In that case, the requested multicast group or source-group comprises an IPTV channel that a subscriber wants to receive. However, the subscriber may not be allowed to view certain channels that are not included in the IPTV package purchased by the subscriber. In some cases, the subscriber may place restrictions on which IPTV channels are viewable at certain times or by certain users. If the subscriber device is not authorized to receive the requested multicast grout or source-group, router 42 may ignore the membership request.

Each of IFCs 54 may include a plurality of interfaces, e.g., virtual connections, to network switches and/or subscriber devices. The virtual connections may comprise ATM PVCs or Ethernet VLANs depending on the type of shared access network over which router 42 connects to the network switches. More specifically, each of IFCs 54 may include at least one mapping interface to receive membership requests for multicast groups. Subscriber devices may, for example, send the membership requests to a network switch over a different interface. The network switch may aggregate and forward the membership requests onto the mapping interface that connects to router 42. Each of IFCs 54 may also include at least one OIF to send multicast streams associated with a specific multicast group to the network switch. Each of the OIFs may be dedicated to a multicast group requested by the subscriber devices. The network switch is then responsible for replicating and forwarding the multicast streams from the dedicated OIFs to the requesting subscriber devices.

Control unit 44 also includes an OIF mapper 50, OIF maps 52, and OIF reference counts 53. OIF maps 52 associate the OIFs of router 42 with their respective multicast groups. A system administrator configures each of the mapping interfaces of router 42 to use only one of OIF maps 52. If one of OIF maps 52 is configured for an interface, then the one of OIF maps 52 is applied to all membership requests received on that interface. In some embodiments, each of the mapping interfaces is configured to use a different one of OIF maps 52. In other embodiments, each of the mapping interfaces may be configured to use the same one of OIF maps 52. In still other embodiments, some of the mapping interfaces may each have a different one of OIF maps 52, and some of the mapping interfaces may share one of OIF maps 52. During the authorization and authentication processes described above, access policies of the subscriber device may be applied. For example, in the case where two or more mapping interfaces use the same one of OIF maps 52, access policies may be used to provide different service levels to the subscriber devices.

The membership requests received on the mapping interfaces of router 42 are of the form <Source, Group> or <*, Group>, where "*" represents all possible sources. The membership requests specify multicast group IP addresses and, in some cases, a specific multicast group source IP addresses. The multicast transmission techniques described herein may be applied to any form of membership requests. For example, the techniques may be applied to IPv4 IGMP versions 1 and 2 and IPv6 MLD version 1 for <*, G> membership requests, and to IP IGMP version 3 and IPv6 MLD version 2 for both <*, G> and <S, G> membership requests.

In accordance with the invention, router 42 receives a membership request for a multicast group from a subscriber device via a network switch on an interface of one of IFCs 54. The subscriber device may use the IGMP to signal the membership request to router 42. In the case of an IPv6 network, the subscriber device may use the MLD protocol to signal a membership request to router 42. The one of IFCs 54 forwards the received membership request to control unit 44.

OIF mapper 50 is capable of interfacing with the IGMP, or MLD, used to signal the membership request to router 42. OIF mapper 50 then determines whether the interface on which the membership request was received is configured to use one of OIF maps 52. In other words, OIF mapper 50 determines whether the receiving interface is a mapping interface. If the interface is a mapping interface, OIF mapper 50 identifies which of OIF maps 52 is configured for the mapping interface. The system administration may configure each mapping interface on router 42 using a CLI command that specifies the name of the corresponding one of OIF maps 52. OIF mapper 50 may be capable of reading the interface configuration command to obtain the corresponding OIF map name.

OIF mapper 50 accesses the identified one of OIF maps 52 corresponding to the mapping interface and compares the received membership request to entries in the one of OIF maps 52. As described in more detail below, in one embodiment, OIF maps 52 contain entries of the form {GroupPrefix, SourcePrefix, OIF}. The system administration may statically configure the OIFs in OIF maps 52. OIF mapper 50 performs the comparison by accessing the identified one of OIF maps 52 first by the group address given in the membership request and then by the source address given in the membership request.

When the membership request matches an entry in the identified one of OIF maps 52, OIF mapper 50 maps the membership request to the OIF given in the identified OIF map. In this way, when two or more subscriber devices connected to the same network switch and request the same multicast stream, OIF mapper 50 maps both of the membership requests to the same OIF. If the identified one of OIF maps 52 contains no entries or if the OIF map configured for the mapping interface does not exist, OIF mapper 50 does not map any membership requests.

OIF mapper 50 then accesses multicast forwarding information 48. Multicast forwarding information 48 controls replication and forwarding of multicast packets to subscriber devices. Control unit 44 updates multicast forwarding information 48 based on messages received from the subscriber devices that indicate a desire to join or leave multicast groups, i.e., to receive or stop receiving multicast streams. In response to a join request, OIF mapper 50 determines whether multicast forwarding information 48 indicates that the multicast stream associated with the requested multicast group is currently forwarded to the network switch, i.e., whether another subscriber device connected to the same network switch is currently receiving the requested multicast stream.

If the requested multicast stream is not currently forwarded, OIF mapper 50 adds the mapped OIF to multicast forwarding information 48. OIF mapper 50 initializes the one of OIF reference counts 53 associated with the mapped OIF and transmits the multicast stream to the network switch over the mapped OIF. If the multicast stream is already forwarded to the network switch, the entry in multicast forwarding information 48 remains unchanged. OIF mapper 50 increments a corresponding one of OIF reference counts 53 that is associated with the mapped OIF.

In this manner, OIF reference counts 53 keep track of the number of subscriber devices currently receiving the associated multicast streams for each OIF. OIF reference counts 53 may fluctuate as the counts 53 are incremented when subscriber devices join the associated multicast group and decremented when subscriber devices leave the associated multicast group. OIF mapper 50 maintains the mapped OIFs until their corresponding OIF reference counts 53 are decremented to zero, i.e., all subscriber devices have left the multicast group associated with the mapped OIF. When one of OIF reference counts 53 is decremented to zero, OIF mapper 50 deletes the associated mapped OIF from multicast forwarding information 48.

When the membership request does not match an entry in the one of OIF maps 52, OIF mapper 50 does not add an OIF to multicast forwarding information 48. If the interface on which the membership request was received is not configured to use one of OIF maps 52, router 42 may transmit multicast traffic substantially similar to conventional transmission techniques.

In some cases a subscriber device sending a membership request on a mapping interface may not want the requested multicast stream to map to another interface. In this case, the one of OIF maps 52 associated with the mapping interface may associate the requested multicast group with the interface "self." In this example, the self keyword specifies the mapping interface as the OIF. In this way, router 42 may transmit multicast traffic over unique interfaces for certain identified multicast groups.

OIF mapper 50 is also responsible for modifying multicast forwarding information 48 when interfaces, e.g., mapping interfaces and OIFs, change state. For example, when OIF mapper 50 maps membership requests received on a mapping interface to OIFs of router 42, the mapping will not affect multicast forwarding information 48 if the mapped OIF is unknown or disabled, e.g., administratively or operationally. However, when the mapped OIF becomes active, OIF mapper 50 adds the mapped OIF to multicast forwarding information 48. Conversely, if an active mapped OIF goes down for any reason, the mapped OIF is deleted from multicast forwarding information 48.

Furthermore, when a mapping interface with currently mapped OIFs goes down, OIF reference counts 53 associated with the mapped OIFs are decremented to zero. As described above, when OIF reference counts 53 are decremented to zero, the associated mapped OIFs are removed from multicast forwarding information 48.

The architecture of router 42 illustrated in FIG. 4 is shown for exemplary purposes only. The invention is not limited to this architecture. In other embodiments, router 42 may be configured in a variety of ways. In one embodiment, for example, control unit 44 and its corresponding functionality may be distributed within IFCs 54. In another embodiment, control unit 44 may include a routing engine that performs routing functions and maintains a routing information base (RIB), e.g., routing information 46, and a forwarding engine that performs packet forwarding based on a forwarding information base (FIB) generated in accordance with the RIB.

Control unit 44 may be implemented solely in software, or hardware, or may be implemented as a combination of software, hardware or firmware. For example, control unit 44 may include one or more processors which execute software instructions. In that case, the various software modules of control unit 44, such as multicast group table manager 50, may comprise executable instructions stored on a computer-readable medium, such as computer memory or hard disk.

Figure 5:
FIG. 5 illustrates an example outgoing interface map in accordance with the invention.

FIG. 5 illustrates an example OIF map 58 in accordance with the invention. OIF map 58 may correspond to any of OIF map 30 from FIG. 2, OIF map 40 from FIG. 3, and OIF maps 52 from FIG. 4. An interface of a network device, such as router 42 from FIG. 4, may be configured to use OIF map 58. When a system administrator configures OIF map 58 for the interface, the interface may be considered a mapping interface.

As described, a subscriber device connected to the network device via a network switch may send membership requests for multicast groups to the network device. The network device receives the membership requests on the mapping interface. The network device then uses OIF map 58 to map the membership requests to an OIF of the network device. Each OIF of the network device may be dedicated to a specific multicast group. The system administration may statically configure each OIF for the network device.

In general, OIF map 58 associates the OIFs of the network device with their multicast groups. The membership requests received on the mapping interfaces are of the form <Source, Group> or <*, Group>, where "*" represents all possible sources. The membership requests specify multicast group IP addresses and, in some cases, a specific multicast group source IP addresses. Upon receipt of a membership request, the network device accesses OIF map 58 configured for the mapping interface and compares the received membership request to entries in OIF map 58.

As shown in FIG. 5, OIF map 58 contains entries of the form {GroupPrefix, SourcePrefix, OIF}. The network device performs the comparison by accessing OIF map 58 first by the group address given in the membership request and then by the source address given in the membership request. When the membership request matches an entry in OIF map 58, the network device maps the membership request to the OIF given in OIF map 58. The mapped OIF is then added to multicast forwarding information. In this way, when two or more subscriber devices connected to the same network switch request the same multicast stream, the network device maps both of the membership requests to the same OIF. When the membership request does not match an entry in OIF map 58, the network device does not map the membership request.

Some example membership request mappings are given below:

<51.0.0.1, 232.0.0.1> is mapped to atm3/0.1 by entry 1
<51.0.0.2, 232.0.0.1> is mapped to atm3/0.2 by entry 2
<51.0.0.3, 232.0.0.1> is not mapped
<*, 232.0.0.1> is not mapped
<51.0.0.1, 233.0.0.1> is mapped to atm3/0.3 by entry 3
<*, 233.0.0.1> is mapped to atm3/0.3 by entry 3
<51.0.0.1, 233.0.0.2> is mapped to atm3/0.4 by entry 4
<51.0.0.2, 233.0.0.254> is mapped to atm3/0.5 by entry 5
<51.0.0.3, 233.0.0.2> is not mapped
<51.0.0.3, 234.0.0.1> is mapped to the mapping interface by entry 6

The system administrator may configure OIF map 58 using CLI commands. For example, the OIF map configuration command may comprise:

ip igmp oif-map <map-name> {<intfType intfValue>|self} [<groupPrefix> [<sourcePrefix>]],

.
.
.

ip igmp oif-map <map-name> {<intfType intfValue>|self} [<groupPrefix> [<sourcePrefix>]]

for IPv4 IGMP and ipv6 mld oif-map <map-name> {<intfType intfValue>|self}
    [groupPrefix> [<sourcePrefix>],

.
.
.

ipv6 mld oif-map <map-name> {<intfType intfValue>|self}
    [<groupPrefix> [<sourcePrefix>]
for IPv6 MLD. In this manner, OIF map 58 may be defined and constructed using multiple CLI commands for the same map name.

In the example of FIG. 5, OIF map 58 includes an interface identified as "self" in entry 6. The keyword self specifies the mapping interface. In some cases, a subscriber device may not want the requested multicast stream to map to another interface. The subscriber device sends a membership request on the mapping interface and OIF map 58 associates the requested multicast group with the mapping interface. In this way, the subscriber device receives the multicast stream on the same interface on which the membership request was sent.

OIF map 58 may be added to interfaces of the network device to generate mapping interfaces. For example, if OIF map 58 is added to an existing active interface of the network device, then the interface is removed as an OIF from the multicast forwarding information. OIF map 58 is then applied to the membership requests from subscriber devices receiving multicast streams on the interface. The network device maps the membership requests to dedicated OIFs of the network device.

Conversely, if an OIF map is removed from a mapping interface, the mapping interface reverts to a regular interface. The OIFs mapped from the interface are deleted from the multicast forwarding information. The interface is then added as an OIF for the multicast streams requested by subscriber devices on the interface.

If an existing entry in OIF map 58 is modified, the mapped OIF for a given <*, G> or <S, G> is changed in the multicast forwarding information. In this case, the network device removes the old mapped OIF from the multicast forwarding information and adds the new mapped OIF.

If OIF map 58 is changed, then the network devices checks the mapping interfaces using OIF map 58 and applies any changes. For example, if a new entry is added to OIF map 58 for a group for which no current <*, G> or <S, G> entry exists, then the network device checks the membership requests on the mapping interface. If new matches are found between the membership requests and the new entry, the network device maps the membership request to the OIF given by the new entry. The network device then adds the mapped OIF to the multicast forwarding information.

As another example, if a new <*, G> entry is added to OIF map 58 for a group for which <S, G> entries exist, then the network device checks the membership requests on the mapping interface and applies any new OIF mappings. Furthermore, if a new <S, G> entry is added to OIF map 58 that already contains a <*, G> entry, the network device checks the membership requests mapped to the OIF given by the <*, G> entry. If <S, G> membership requests exists, the network device removes the old <*, G> mapping from the membership requests and the new mapping is applied.

Figure 6A:
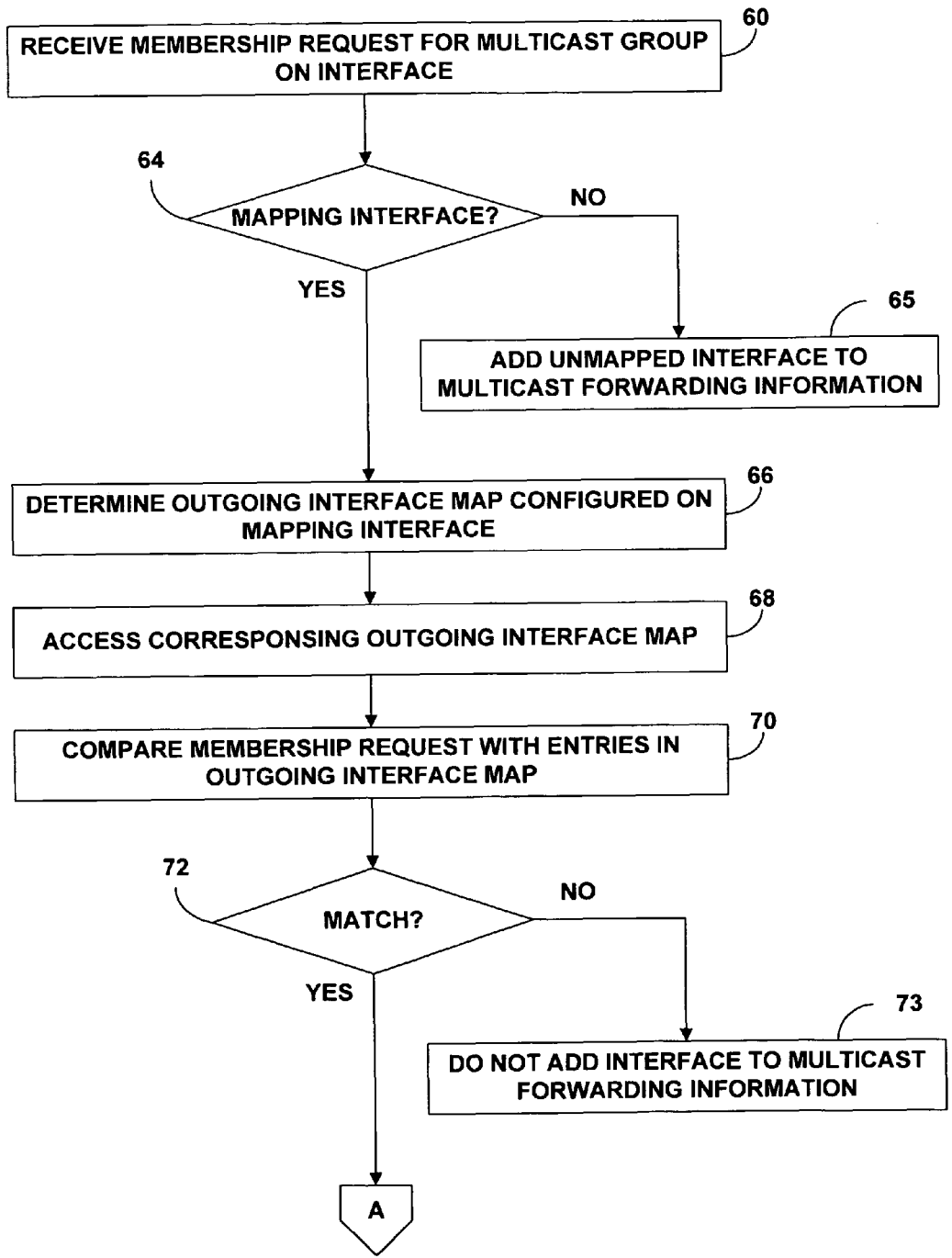
FIGS. 6A and 6B are flowcharts illustrating an example operation of a network device capable of receiving membership requests for multicast groups on a first interface and sending the multicast streams associated with the multicast groups on a second interface.
Figure 6B:
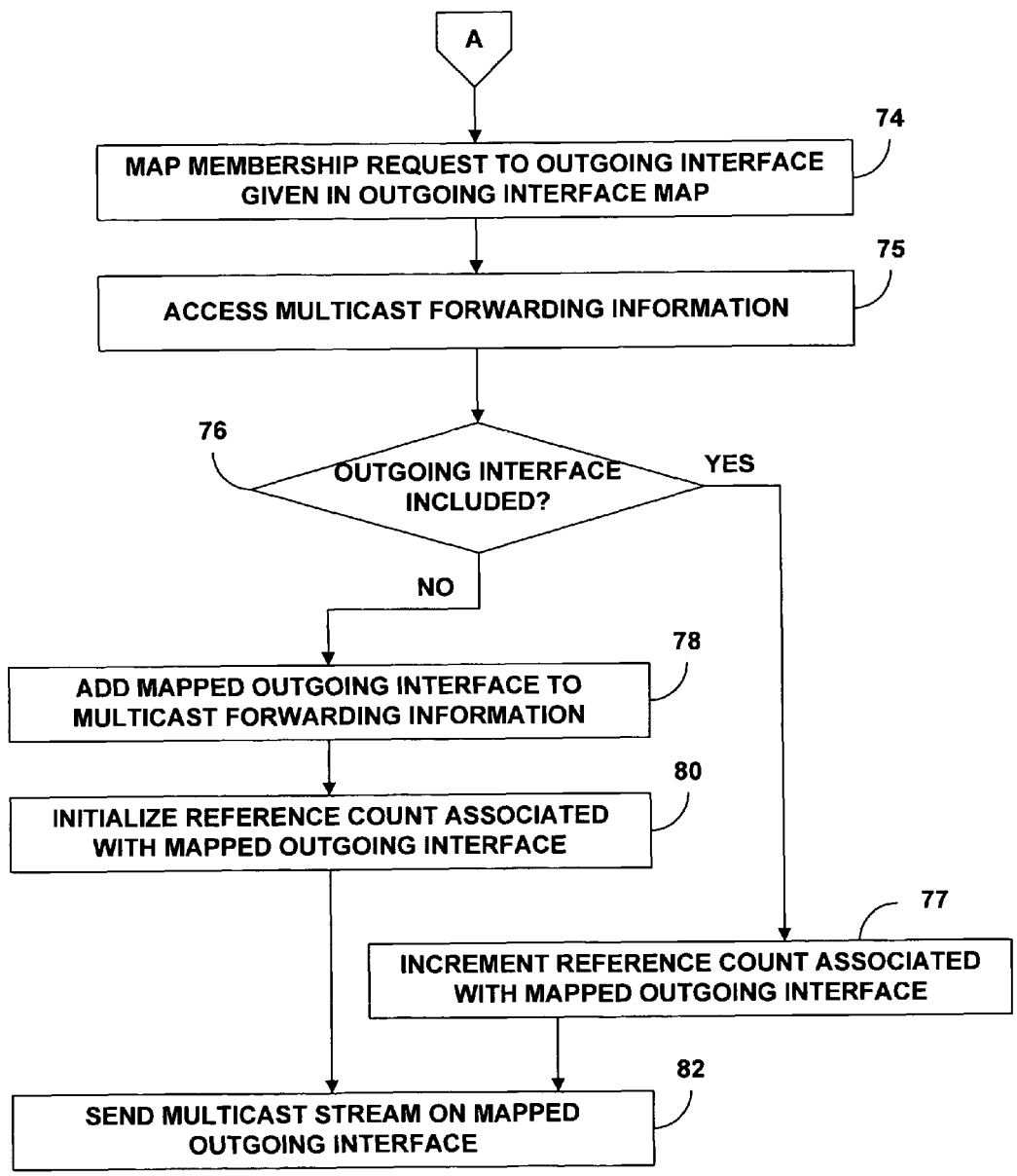

FIGS. 6A and 6B are flowcharts illustrating an example operation of a network device capable of receiving membership requests for multicast groups on a first interface and sending the multicast streams associated with the multicast groups on a second interface. For exemplarily purposes, the flowchart is described in reference to router 42 from FIG. 4.

Initially, router 42 receives a membership request for a multicast group from a subscriber device via a network switch on an interface of one of IFCs 54 (60). The subscriber device may use the IGMP to signal the membership request to router 42. In the case of an IPv6 network, the subscriber device may use the MLD protocol to signal a membership request to router 42.

OIF mapper 50 determines whether the interface on which the membership request was received is configured to use one of OIF maps 52. In other words, OIF mapper 50 determines whether the receiving interface is configured to operate as a mapping interface (64). When the interface on which the membership request was received is not a mapping interface (no branch of 64), OIF mapper 50 adds an unmapped interface to multicast forwarding information 48 (65). The unmapped interface may transmit the requested multicast stream substantially similar to conventional transmission techniques.

If the interface is a mapping interface (yes branch of 64), OIF mapper 50 identifies which of OIF maps 52 is configured for the mapping interface (66). OIF mapper 50 accesses the identified one of OIF maps 52 corresponding to the mapping interface (68), and compares the received membership request to entries in the identified OIF map to the received membership request (70). OIF mapper 50 may perform the comparison by accessing the one of OIF maps 52 first by the group address given in the membership request and then by the source address given in the membership request. When the membership request does not match an entry in the one of OIF maps 52 (no branch of 72), OIF mapper 50 does not add an interface to multicast forwarding information 48 (73).

When the membership request matches an entry in the one of OIF maps 52 (yes branch of 72), OIF mapper 50 maps the membership request to the OIF given in the one of OIF maps 52 (74). OIF mapper 50 then accesses multicast forwarding information 48 (75). OIF mapper 50 determines whether the mapped OIF is already included in multicast forwarding information 48 (76). In other words, OIF mapper 50 determines whether the multicast stream associated with the requested multicast group is already being forwarded to the network switch, i.e., whether another subscriber device connected to the same network switch is currently receiving the requested multicast stream.

If the requested multicast stream is not currently forwarded (no branch of 76), OIF mapper 50 adds the mapped OIF to multicast forwarding information 48 (78). OIF mapper 50 initializes the one of OIF reference counts 53 associated with the mapped OIF (80). OIF mapper 50 then pushes the multicast stream to the network switch over the mapped OIF (82). If the multicast stream is already forwarded to the network switch (yes branch of 76), the entry in multicast forwarding information 48 remains unchanged. OIF mapper 50 increments the one of OIF reference counts 53 associated with the mapped OIF (77). Router 42 continues to send the multicast stream down the mapped OIF (82).

Various embodiments of the invention have been described. These and other embodiments are within the scope of the following claims.

The invention claimed is:
1. A method comprising:
    receiving a first membership request from a first subscriber device via a network switch coupled to a first interface of a network device, wherein the membership request specifies a first multicast group;

mapping the first membership request to a second interface of the network device, wherein the second interface is different from the first interface;

receiving a second membership request from a second subscriber device via the network switch for the first multicast group on the first interface;

mapping the second membership request to the second interface;

receiving a third membership request from a third subscriber device via the network switch for a second multicast group on the first interface, wherein the second multicast group is different from the first multicast group;

mapping the third membership request to a third interface of the network device, wherein the third interface is different from the first interface and the second interface;

sending a single multicast stream associated with the first multicast group to the network switch on the second interface of the network device for both the first subscriber device and the second subscriber device; and sending a single multicast stream associated with the second multicast group to the network switch on the third interface of the network device for the third subscriber device.

2. The method of claim 1, further comprising:
accessing multicast forwarding information of the network device in response to the first membership request; and
determining whether the second interface is included in the multicast forwarding information.

3. The method of claim 2, further comprising adding the second interface to the multicast forwarding information when the second interface is not included in the multicast forwarding information.

4. The method of claim 2, further comprising initializing a reference count associated with the second interface when the second interface is not included in the multicast forwarding information, wherein the reference count indicates a number of subscriber devices that have requested membership in the multicast group.

5. The method of claim 2, further comprising incrementing a reference count associated with the second interface when the second interface is included in the multicast forwarding information, wherein the reference count indicates a number of subscriber devices that have requested membership in the multicast group.

6. The method of claim 1, further comprising:
receiving a leave request from the subscriber device on the first interface of the network device; and
decrementing a reference count associated with the second interface, wherein the reference count indicates a number of subscriber devices that have requested membership in the multicast group.

7. The method of claim 6, further comprising removing the second interface from multicast forwarding information of the network device when the reference count associated with the second interface is decremented to zero.

8. The method of claim 1, wherein the second interface comprises an outgoing interface dedicated to the multicast group.

9. The method of claim 1, further comprising adding an unmapped interface to multicast forwarding information of the network device when the first interface is not configured to use an outgoing interface map.

10. The method of claim 1, wherein the first interface comprises a mapping interface configured to use an outgoing interface map.

11. The method of claim 10, further comprising:
accessing the outgoing interface map configured for the first interface, wherein the outgoing interface map associates multicast group entries with outgoing interfaces of the network device; and
comparing the first membership request to the multicast group entries in the outgoing interface map.

12. The method of claim 11, further comprising:
matching the first membership request to one of the multicast group entries in the outgoing interface map associated with the second interface; and
mapping the first membership request to the second interface in accordance with the outgoing interface map.

13. The method of claim 11, further comprising not adding an interface to multicast forwarding information of the network device when the membership request does not match to any of the multicast group entries in the outgoing interface map.

14. The method of claim 1, further comprising determining whether the subscriber device is authorized to receive the requested multicast stream.

15. The method of claim 1, further comprising ignoring the membership request when the subscriber device is not authorized to receive the requested multicast stream.

16. A network device comprising:
a first interface coupling the network device to a network switch, wherein the first interface carries a first membership request from a first subscriber device for a first multicast group, a second membership request from a second subscriber device for the first multicast group, and a third membership request from a third subscriber device for a second multicast group;
a second interface coupling the network device to the network switch, wherein the second interface carries a single multicast stream associated with the first multicast group for both the first subscriber device and the second subscriber device;
a third interface coupling the network device to the network switch, wherein the third interface carries a single multicast stream associated with the second multicast group for the third subscriber device; and
a control unit that receives the first membership request, the second membership request, and the third membership request from the network switch on the first interface and sends the multicast stream associated with the first multicast group to the network switch on the second interface and the multicast stream associated with the second multicast group to the network switch on the third interface, the control unit further comprising a multicast group table manager that maps the first membership request and the second membership request to the second interface and the third membership request to the third interface.

17. The network device of claim 16, wherein the multicast group table manager accesses multicast forwarding information included in the control unit; and determines whether the second interface is included in the multicast forwarding information.

18. The network device of claim 17, wherein the multicast group table manager adds the second interface to the multicast forwarding information when the second interface is not included in the multicast forwarding information, and initializes a reference count associated with the second interface to track a number of subscriber devices that have requested membership in the first multicast group.

19. The network device of claim 17, wherein the multicast group table manager increments a reference count associated with the second interface when the second interface is included in the multicast forwarding information, wherein the reference count indicates a number of subscriber devices that have requested membership in the first multicast group.

20. The network device of claim 16,
wherein the control unit receives a leave request from the subscriber device on the first interface, and
wherein a multicast group table manager included in the control unit decrements a reference count associated with the second interface, wherein the reference count indicates a number of subscriber devices that have requested membership in the first multicast group.

21. The network device of claim 20, wherein the multicast group table manager removes the second interface from multicast forwarding information included in the control unit when the reference count associated with the second interface is decremented to zero.

22. The network device of claim 16, wherein the second interface comprises an outgoing interface dedicated to the first multicast group.

23. The network device of claim 16, further comprising a plurality of second interfaces, wherein each of the plurality of second interfaces is dedicated to a specific multicast group.

24. The network device of claim 16, further comprising an outgoing interface map that associates multicast group entries with outgoing interfaces of the network device.

25. The network device of claim 24, further comprising a multicast group table manager that compares the membership request to the multicast group entries in the outgoing interface map, and maps the membership request to the second interface based on a result of the comparison.

26. The network device of claim 24, further comprising a plurality of mapping interfaces, wherein each of the plurality of mapping interfaces is configured to use the outgoing interface map.

27. The network device of claim 16, further comprising a plurality of mapping interfaces,
wherein the control unit includes a plurality of outgoing interface maps that associate multicast group entries with outgoing interfaces of the network device, and
wherein each of the plurality of mapping interfaces is configured to use a different one of the plurality of outgoing interface maps.

28. The network device of claim 16, wherein the first membership request includes an address of the first multicast group.

29. The network device of claim 16, wherein the first and second interfaces comprise physical interfaces or virtual interfaces.

30. The network device of claim 16, wherein the first and second interfaces comprise one of Asynchronous Transfer Mode permanent virtual circuits or Ethernet virtual local access networks.

31. The network device of claim 16, wherein the network switch comprises one of a digital subscriber line access multiplexer or an Ethernet switch.

32. The network device of claim 16, wherein the subscriber device comprises one of a personal computer, a laptop, a workstation, a personal digital assistant (PDA), a wireless device, a network-ready appliance, a file server, or a print server.

33. The network device of claim 16, wherein the network device comprises a router.

34. The network device of claim 16, further comprising a unicast interface coupling the network device to the subscriber device, wherein the unicast interface carries unicast traffic.

35. A non-transitory computer-readable medium comprising instructions that cause a programmable processor to:
receive a first membership request from a first subscriber device via a network switch coupled to a first interface of a network device, wherein the first membership request specifies a first multicast group;
receive a second membership request from a second subscriber device via the network switch coupled to the first interface of the network device, wherein the second membership request specifies the first multicast group;
map the first membership request and the second membership request to a second interface of the network device, wherein the second interface is different from the first interface;
receive a third membership request from a third subscriber device via the network switch for a second multicast group on the first interface, wherein the second multicast group is different from the first multicast group;
send a single multicast stream associated with the first multicast group to the network switch on the second interface for both the first subscriber device and the second subscriber device; and
send a single multicast stream associated with the second multicast group to the network switch on the third interface of the network device for the third subscriber device.

36. The non-transitory computer-readable medium of claim 35, further comprising instructions that cause the programmable processor to:
access an outgoing interface map configured for the first interface, wherein the outgoing interface map associates multicast group entries with outgoing interfaces of the network device;
compare the first and second membership requests to the multicast group entries in the outgoing interface map;
match the first and second membership requests to one of the multicast group entries in the outgoing interface map associated with the second interface;
match the third membership request to another of the multicast group entries in the outgoing interface map associated with the third interface; and
map the first and second membership requests to the second interface and the third membership request to the third interface in accordance with the outgoing interface map.

37. A network device comprising:
a plurality of input interfaces, each of the input interfaces coupling the network device to a different network switch;
a plurality of output interfaces;
a plurality of data structures defining a plurality of output interface maps, each of the output interface maps corresponding to a different one of the plurality of input interfaces to map multicast groups for which join requests were received by the respective input interface to different ones of the output interfaces of the network device;
a control unit that receives a plurality of membership requests for different multicast groups from the network switches via the logical input interfaces,
wherein the control unit maps each of the multicast groups to a different corresponding one of the plurality of output interfaces in accordance with the data structures and outputs a single multicast stream for each of the multicast groups to the network switch on the corresponding output interface.

38. The network device of claim 37, wherein the control unit associates each of the different output interface maps with its corresponding one of the plurality of logical input interfaces based on input from an administrator.

39. A network device comprising:
- a plurality of mapping interfaces, each of the mapping interfaces coupling the network device to a different one of a plurality of network switches, that receive join requests via the respective one of the plurality of network switches;
- a plurality of logical output interfaces coupling the network device to the plurality of network switches, such that the network device is coupled to each of the plurality of network switches by one or more of the plurality of logical output interfaces;
- a plurality of data structures defining a plurality of output interface maps, each of the output interface maps corresponding to a different one of the plurality of mapping interfaces to map multicast groups for which join requests were received by the respective one of the plurality of mapping interfaces to one of the one or more of the plurality of logical output interfaces coupling the network device to the respective one of the plurality of network switches;
- a control unit that receives a plurality of membership requests for different multicast groups from the plurality of network switches via the plurality of mapping interfaces, maps each of the multicast groups to different ones of the plurality of output interfaces for each of the plurality of network switches using respective ones of the plurality of data structures, and, for each of the plurality of network switches, outputs a single multicast stream for each of the multicast groups to the network switch on the corresponding one of the plurality of logical output interfaces.

* * * * *